United States Patent Office 3,465,081
Patented Sept. 2, 1969

3,465,081
METHOD OF CONTROLLING PESTIFEROUS ORGANISMS
Donald W. Fuhlhage, Kansas City, Mo., assignor to Thompson-Hayward Chemical Company, Kansas City, Kans., a corporation of Delaware
No Drawing. Filed May 13, 1966, Ser. No. 549,788
Int. Cl. A01n 9/20
U.S. Cl. 424—309        2 Claims

ABSTRACT OF THE DISCLOSURE

This invention relates to the control of pestiferous organisms, particularly nematodes, by causing said organisms to be contacted with a pesticidal amount of a compound of the formula:

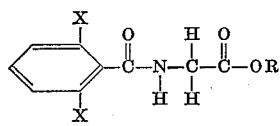

wherein each X may be halogen and R may be hydrogen, alkyl, aryl or acyl, and the salts thereof.

---

This invention relates to and has for its objective the provision of new chemical compounds and novel methods for the preparation thereof. More particularly, this invention has for its object the provision of new chemical compounds of the formula:

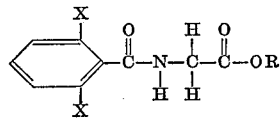

wherein each X is a halogen, for example, bromo or chloro; and R is selected from the group consisting of hydrogen, alkyl, (e.g. methyl, or ethyl), aryl, (e.g. phenyl) and acyl and the salts thereof. In the preferred embodiments of this invention, X is chloro and R is hydrogen.

The preferred acyl radicals of this invention are those of hydrocarbon carboxylic acids of less than twelve carbon atoms, as exemplified by the lower alkanoic acids (e.g. acetic, propionic or butyric acids), the lower alkenoic acids, the monocyclic aryl carboxylic acids (e.g. benzoic and toluic acid), the monocylic aryl lower alkanoic acids (e.g. phenactic and phenylpropionic acids), the cycloalkene carboxylic acids.

The compounds of this invention have been found to possess biological activity and for this purpose may be employed as selective herbicides, having both pre-emergent and post-emergent application. In addition, the novel compounds of this invention have also been found to possess nematocidal activity and may be employed against such nematodes as the Panagrellus species. The compounds of this invention may be employed for the purposes of this invention in any manner known to the art. Therefore they may be incorporated into suitable compositions for application to the plant or pestiferous animal sought to be attacked. Thus the compounds of this invention may be incorporated into dusts, powders, sprays, and other like compositions so as to provide a herbicidally or pesticidally effective amount of the compounds of this invention upon contacting the plant or pest sought to be treated thereby.

The new compounds of this invention may be prepared by the novel processes of this invention which comprises a number of steps beginning with a dihalobenzoyl halide or dihalobenzamide as the starting material. Among the suitable starting materials employable in the practice of this invention may be included such compounds as 2,6-dichlorobenzoyl chloride, 2,6-dibromobenzoyl chloride, 2,6-dichlorobenzamide, or 2,6-dibromobenzamide.

In the first step of the process of this invention the dihalobenzoyl halide starting is blended with a solution of an amino acid, for example, glycine, in a base, for example, an alkali metal hydroxide, such as sodium or potassium hydroxide.

The resultant admixture is then treated with sufficient inorganic acid, for example, a hydrohalic acid, such as hydrochloric acid, to yield a precipitate of the desired compound wherein R is hydrogen, which may then be separated and dried, and which is a new product of this invention.

In order to obtain the other novel final products of this invention, i.e. wherein R is alkyl or acyl, the free acid may be acylated as by treatment with the desired acylating agent (e.g. acyl chloride or acid anhydride) in the presence of a base, such pyridine to yield the desired acyl derivative or esterified as by treatment with the desired alcohol in the presence of an acidic catalyst, such as sulfuric acid. Although any alkyl or acyl derative may be thus prepared, the preferred mixed anhydrides or esters are those with hydrocarbon carboxylic acids or alcohols of less than twelve carbon atoms, prepared by reaction with the acyl chloride or acid anhydride of one of the suitable acids, or with one of the suitable alcohols, set forth hereinabove.

The esters of this invention may also be obtained by treatment of the alkali metal salt, e.g. the sodium or potassium salt, of 2,6-dihalobenzamide, e.g. 2,6-dichlorobenzamide, with the appropriate ester of mono-chloroacetic acid.

In the event the final compounds of the instant invention are desired to be employed in the form of their salts, the desired salts may be prepared in any manner known to the art. For example, dialkyl amine salts may be reacting the hippuric acid final product with a dilute dialkyl amine solution.

The invention may be further illustrated by the following examples:

EXAMPLE 1

2,6-dichlorohippuric acid

A mixture of 44.5 grams of 2,6-dichlorobenzoic acid and 120 grams of thionyl chloride is refluxed gently for five hours, then the excess thionyl chloride is stripped off under vacuum. The resulting crude 2,6-dichlorobenzoyl chloride is added slowly with vigorous stirring to a cooled mixture of 20.0 grams of glycine, 12.5 grams of sodium hydroxide and 125 ml. of water. A solution of 10 grams of sodium hydroxide in 25 ml. of water is added simultaneously with the 2,6-dichlorobenzoyl chloride. The resulting mixture is stirred for 1 hour at 0° to 10° C., 2 hours at 30° C., and is then poured, with stirring, into 30 ml. of concentrated hydrochloric acid, cooled to room temperature, filtered, and air dried, to yield about 52 grams of desired product, in the form of a white granular solid, melting at 187°–190° C.

Similarly, following the procedure of Example 1, but substituting an equivalent amount of 2,6-dibromobenzoic acid for 2,6-dichlorobenzoic acid there is obtained 2,6-dibromohippuric acid.

EXAMPLE 2

Butyl ester of 2,6-dichlorohippuric acid

To a freshly prepared solution of 21 grams of the sodium salt of 2,6-dichlorobenzamide is slowly added 15 grams of the butyl ester of mono-chloroacetic acid, and the resulting mixture is refluxed with stirring for 1 hour. After cooling, the mixture is filtered and the solvent is removed. The residue is taken up in 150 ml. of benzene and this solution is washed with three 50 ml. portions of water. Distillation of the benzene solution yields the desired product.

Similarly, following the procedure set forth in Example 2, but substituting an equivalent amount of the phenyl ester of monochloro acetic acid for the butyl ester of monochloro acetic acid there is obtained the phenyl ester of 2,6-dichlorohippuric acid.

EXAMPLE 3

Dimethyl amine salt of 2,6-dichlorohippuric acid

Twenty-five grams of 2,6-dichlorohippuric acid is dissolved in 115 grams of a 40% aqueous dimethyl amine solution with stirring. The resulting solution of dimethyl amine salt of 2,6-dichlorohippuric acid is useful as a water soluble formulation for direct application as a herbicide.

EXAMPLE 4

Acetic anhydride of 2,6-dichlorohippuric acid

About 250 mg. of 2,6-dichlorohippuric acid is acylated with 5 ml. of pyridine and 10 ml. of acetic anhydride. Removal of the reagents furnishes a crude produce and recrystallization from dioxane yields the acetic anhydride of 2,6-dichlorohippuric acid.

EXAMPLE 5

Test compounds at a dosage level of 2500 p.p.m. are pipetted in 5 ml. quantities onto filter paper contained within plastic Petri dishes. Seeds of the selected crops are then placed on the treated discs and observed for germination over a period of time. The number of seeds germinating and general observations on extent of root and cotyledon damage is an index of herbicidal potential, which may be determined for each compound as a Phytotoxicity Rating ("P.R.") which varies from 0.0, or no herbicidal effect to 10.0 or highest herbicidal effect. The results obtained with the compounds of this invention are reported in Table 1.

TABLE 1

| Test compound | Test crops | Oats | Tomato | Radish | Cucumber |
|---|---|---|---|---|---|
| 2,6-dichlorohippuric acid | Percent germination | 68 | 0 | 36 | 90 |
| | "P.R." | 7.5 | 10.0 | 8.0 | 5.2 |
| Control | Percent germination | 84 | 70 | 94 | 80 |
| | "P.R." | 0.0 | 0.0 | 0.0 | 0.0 |

EXAMPLE 5

This is a test to determine nematocidal activity of test compounds against a species of Panagrellus, an active saprozoic nematode.

The nema are collected from the culture medium in a routine manner to insure their freedom from food contamination and uniformity of age by means of a Baerman funnel technique. The screen is carried out in stoppered test tubes containing 10 ml. of the chemical-dosage (500 and 50 p.p.m.), to be tested and the nematode population, at the time of seeding, adjusted to 50–75 per tube. The test is run in duplicate and the check or blank contain nema in tap water. The namtodes, when properly handled, will survive at least seven days in the blanks without the addition of food.

Microscopic observations on the behavior of the nema are made daily over a period of five to seven days to establish the rapidity of action of the chemical and the final end point of kill. The constant and active movement of this species permits easy identification of live and dead individuals. The rapid and short cycle of reproduction by parthogenesis permits observations of the effect of the chemicals on reproductive behavior and also on individuals of different ages. The results of the test are reported in Table 2.

TABLE 2

| Test compound | Dose (p.p.m.) | Percent nematode mortality after— | |
|---|---|---|---|
| | | 2 days | 4 day |
| 2,6-dichlorohippuric acid | 500 | 85 | 100 |
| | 50 | 50 | 85 |
| | 5 | 0 | 30 |
| Control | | 0 | 3 |
| | | 0 | 5 |
| | | 0 | 0 |

What is claimed is:

1. The method of controlling nematodes which comprises contacting said nematodes with a nematocidal amount of a compound of the formula

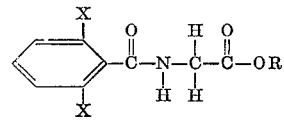

wherein each X is selected from the group consisting of chloro and bromo; and R is selected from the group consisting of hydrogen, alkyl of from one to four carbon atoms, phenyl, and acyl of a hydrocarbon carboxylic acid of less than twelve carbon atoms; or the dimethyl amine salt thereof.

2. The method of claim 1, wherein each X is chloro and R is hydrogen.

References Cited

UNITED STATES PATENTS 3,056,669   10/1962   Moyle et al. _____ 71—115

ALBERT T. MEYERS, Primary Examiner

VINCENT D. TURNER, Assistant Examiner

U.S. Cl. X.R.

71—111; 424—319